Aug. 6, 1940.     G. M. HAUSLER     2,210,760
CONTROLLER
Filed April 28, 1938

Inventor:
George M. Hausler,
by *Harry E. Dunham*
His Attorney.

Patented Aug. 6, 1940

2,210,760

UNITED STATES PATENT OFFICE 2,210,760

CONTROLLER

George M. Hausler, Schenectady, N. Y., assignor to General Electric Company, a corporation of New York Application April 28, 1938, Serial No. 204,803

3 Claims. (Cl. 200—88)

My invention relates to controllers, more particularly to systems and apparatus for controlling the starting circuit of a split-phase motor and for protecting the motor from excessive current flow therethrough by reason of over-load, and has for its object the provision of a simple, reliable device of this character which is inexpensive and easy to manufacture.

It is well understood, of course, that it is necessary to provide means for insuring that the starting winding of the motor shall be energized during and only during the starting period. It is also highly desirable to protect the motor from excessive current both during running and stalled conditions. Accordingly, it is a further object of my invention to provide a controller which is compact, economical to manufacture, and which controls with great reliability the starting and running conditions of the motor. A still further object of my invention is to provide a controller structure supported upon a base which may be easily mounted and connected in the motor circuit to be controlled.

Figure 1:
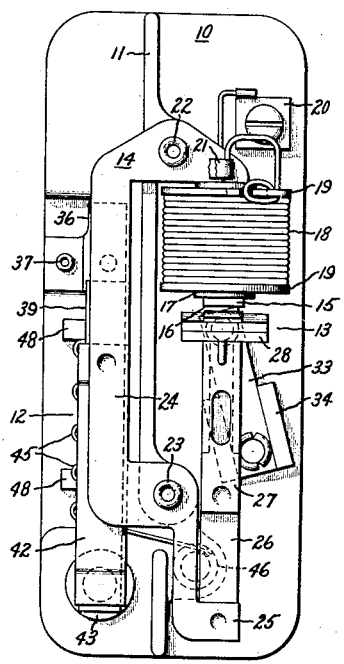
Figure 2:
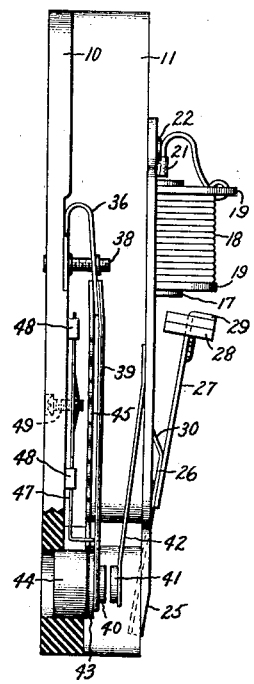
Figure 3:
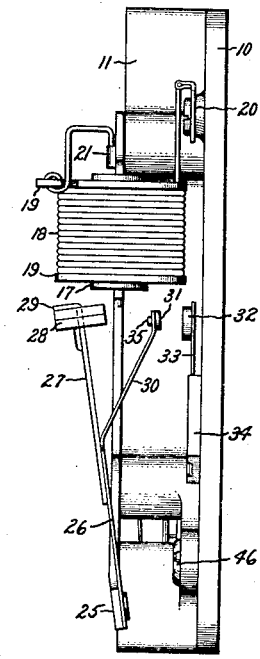
Figure 4:
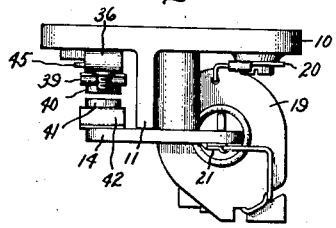
Figure 5:
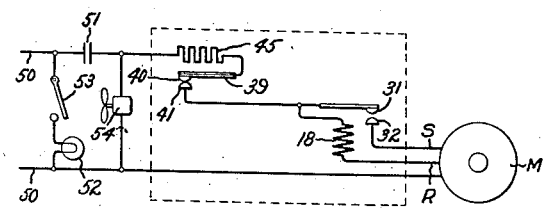

For a more complete understanding of my invention, reference should be had to the accompanying drawing in which, Fig. 1 is a plan view of a controller embodying my invention; Fig. 2 is a left side elevational view of Fig. 1 partly in section; Fig. 3 is a right side elevational view of Fig. 1; Fig. 4 is an elevational view of the upper end of Fig. 1; and Fig. 5 is a circuit diagram of a controller embodying my invention in a typical refrigeration motor circuit.

Referring now to the drawing, I have shown my invention in one form as applied to a starting and over-load controller for a split-phase motor used in connection with a refrigeration system. However, it will be obvious that my invention has broad application to motors requiring special starting means and over-load protection. The controller is shown mounted on a base 10 of suitable insulating material having a vertically projecting dividing wall 11 running longitudinally of the base 10. The wall 11 serves to segregate a thermally actuable over-load responsive device 12 from the major portions of an alternating current starting relay 13 secured to the base 10. The starting relay 13 comprises a magnetizable yoke-shaped frame 14 having a core member provided with a pole face 16. Encircling the core member 15 and insulated therefrom by a cylindrical insulating jacket 17 is an energizing winding 18, the ends of which are covered by insulating shields 19. The winding 18 is connected in series with a terminal 20 secured to the base 10 and the frame 14 at joining point 21. The frame 14 rests on and is secured to the upper face of the wall 11 by a pair of rivets 22 and 23 and has an intermediate portion 24 overhanging the over-load contactor 12.

Formed at the other end of the frame 14 is a supporting member 25 to which is secured one end of a cantilever spring 26, the other end of which carries an armature 27 secured thereto, and formed of iron or other magnetizable material. As shown, the portions of the frame 14 lie on substantially a common plane, and the spring 26 normally is positioned at a slight angle with the common plane for supporting the armature 27 in a spaced relation to the pole face 16 of the magnetizable frame 14 so as to form an air gap between the armature and the frame, the spring 26 being mounted for lateral oscillation in a plane perpendicular to the common plane of the frame. Secured to the armature 27 adjacent the end nearest the air gap, I have provided a short-circuited winding 28 comprising a double-turn coil of highly conductive material, such as copper, the purpose of which will be more fully described later.

The armature 27 may consist of a body portion of magnetic material which is provided with a thickened or broadened end portion 29, the face of which may be substantially at 90° with the axial plane of the extending spring 26 in its normal unbiased position. The purpose of this end portion 29 is to provide a continuously decreasing air gap and a continuously increasing magnetic force between the armature 27 and the pole face 16 as the armature is moved adjacent and transversely across the pole face 16 when the frame 14 is energized. The end portion 29 of the armature 27 may also be made several times as thick as the thickness of the pole face 16 for preventing a reversal of the magnetic force between these two members, such as would occur if the armature 27 had a thin end which could move entirely past the pole face 16 of the core member 15. I prefer to form the armature 27 from a flat metal stamping having a bent end 29 extending upwardly at substantially 90° from the body of the armature 27. It will be obvious, of course, that various other shapes and forms of armatures may be used without departing from the spirit of my invention. The operation of the armature will be more fully described hereinafter.

Extending outwardly and downwardly from the cantilever spring 26 is a spring finger 30 which supports a movable starting contact 31 in co-operating relation with a relatively fixed contact 32 carried on a supporting arm 33 of a terminal 34 fixed to the base 10. The spring finger 30 is arranged to assist the cantilever spring 26 in opposing the movement of the armature 27 downwardly in response to the magnetic force thereon from the core member 15. The projecting point 35 on the upper end of the movable contact 31 is also arranged to limit the downward movement of the armature 27 by bumping the bottom of the short-circuited winding 28 if the armature reaches this extreme position.

Now passing to the over-load responsive device 12, I have provided a U-shaped adjustable supporing member 36 fixed to the base 10 by a rivet 37 and provided with a threaded adjusting screw 38 extending transversely through the legs of the U and adapted to spread or contract the U member 36. Fastened to the upper leg of the member 36 is a bimetallic strip 39 extending longitudinally of the base 10 in a spaced relation thereto, the spacing being readily adjustable by the adjusting screw 38. The bimetallic strip 39 may be of two metals having different coefficients of expansion, such as Invar and steel, suitably fastened together for deflection in response to changes in temperature. The free end of the strip 39 is arranged to deflect downwardly with a rise in temperature and carries on its upper face a movable over-load contact 40 in normal engagement with a relatively fixed over-load contact 41 which is mounted on a resilient strip 42 of conducting material. The resilient strip 42 is attached by brazing or other suitable means to the overhanging portion 24 of the frame 14 in good electrical connection therewith.

On the lower face of the bimetallic strip 39 is secured a disc-shaped armature 43 made of magnetic material, such as soft iron, and positioned to be attracted into engagement with a permanent magnet 44 fixed on the base 10 below the armature 43. To provide, with a magnet of limited size, the necessary force to impart a snap movement to the bimetallic strip 39 downwardly when it has deflected a predetermined amount, I prefer to make the magnet 44 from particular materials and of a distinctive shape. The magnet 44 is preferably made of an alloy having a high coercive force consisting essentially of aluminum, nickel, copper and iron, such as described and claimed in United States Letters Patent 1,947,274, issued February 13, 1934, to William E. Ruder. I prefer to form this magnetic material into a button or disc shape having a central groove running diametrically across the upper face and suitably magnetized to have a north pole and a south pole on the face adjacent the armature 43. Beneath the bimetallic strip 39, I provide for heating the strip a resistance heater wire 45 which is spaced respectively from the base 10 and the strip 39 and is fastened in electrical connection to the fixed end of the strip 39 and to a line terminal 46 on the base 10.

Besides the spacing adjustment 38, an adjustable resilient stop 47 is provided for the bimetallic strip 39 to prevent the armature 43 from being retained by the permanent magnet 44 in an attracted position after the strip 39 has cooled and seeks to return to an undeflected position. The stop 47 consists of a strip of resilient material having an upwardly extending end arranged to press against the bimetallic strip 39 in its attracted position. The stop 47 is carried on a pair of abutments 48 projecting from the base 10 and is threaded at the middle to receive an adjustable screw 49 which may be used to adjust the strip 47 to raise or lower the end which comes in contact with and limits the downward movement of the bimetallic strip 39.

At this point it may be noted that the frame 14 of the starting relay 13 forms both a magnetic circuit for the relay and a portion of the electrical circuits of the relay 13 and the over-load responsive device 12. The magnetic circuit comprises the core member 15, the overhanging frame portion 24, the cantilever spring 26, the armature 27, and the air gap between the pole face 16 and the armature 27. The running circuit of the controller beginning at the line terminal 46 comprises the heater wire 45, the bimetallic strip 39, the over-load contacts 40 and 41, the resilient strip 42, the frame portion 24, the energizing winding 18, and the terminal 20. The starting circuit of the controller starting from the line terminal 46 comprises the heater wire 45, the bimetallic strip 39, the overload contacts 40 and 41, the frame portion 24, the cantilever spring 26, the spring finger 30, the starting contacts 31 and 32, the connector 33, and the terminal 34. The electrical circuits will hereinafter be termed the running circuit and the starting circuit, respectively.

Referring now to Fig. 5, I have shown a controller embodying my invention connected in circuit with a motor M of a refrigerator. The motor M may have a starting winding and a running winding connected in a well known manner. The starting and running winding terminals of the motor are indicated respectively at S and R. The circuit may be supplied from a source of alternating current 50 and may be switched on or off by a cold control 51 which operates in accordance with the temperature in the refrigerator cooling compartment in a manner well known in the art. Paralleling the source 50 may be a light 52 for the refrigerator operable by a switch 53 independently of the operation of the refrigerator itself. I have also shown paralleling the source 50 a fan 54 which operates only when the line circuit is completed through the cold control 51. The fan 54 may be used to blow cooling air over the heat emitting portions of the refrigerator, such as the condenser.

Briefly, the running circuit of the controller including the energizing winding 18 is connected in series with the source 50, the cold control 51, and the running winding terminal R of the motor M. The starting circuit including the magnetically operated started contacts 31 and 32 which are normally biased out of engagement by the cantilever spring 26 is connected in series with the starting terminal S of the motor M. When the cold control 51 is actuated to complete the line circuit 50, a rush of current flows through the running winding of the motor M which is in a stalled condition. When the motor is not operating, since the resistance of the running circuit is low, a high current will flow through the energizing winding 18 and cause the frame 14 to be highly magnetized. Thereupon, the armature 27 is attracted toward the energized pole face 16 of the core member 15, and the starting contacts 31 and 32 are brought into engagement to complete a circuit through the starting winding of the motor M for starting the motor. Gradually, as the speed of the motor M increases, the current flowing through the running circuit and the energizing winding 18 is decreased and a corresponding decrease in the magnetic force on the armature 27 results. Finally, the spring force of the cantilever spring 26 and the spring finger 30 causes a snap movement of the armature 27 out of the attached position and the starting contacts 31 and 32 disengage. Thereafter, the motor M operates in a normal manner on only its running winding.

The thermally actuable over-load device 12 is so adjusted that for normal running conditions the heat from the heater wire 45 is insufficient to deflect the bimetallic strip 39 to an extent where the armature 43 on the strip 39 will be attracted to the permanent magnet 44. Neither does the initial high current that flows in the heater wire 45 when the motor is just starting cause the strip 39 to be deflected sufficiently to be snapped to the magnetically attracted position. This high current flows for a relatively short time and quickly decreases to a low value as the motor M accelerates.

However, should the motor M refuse to start or be stalled for any reason or should a condition of over-load occur during operation, the resulting high current through the heater wire 45 will quickly cause the bimetallic strip 39 to deflect and be magnetically attracted. The overload contacts 40 and 41 will thereby disengage and interrupt the flow of current to the motor M.

Referring now to Fig. 3, I have shown the armature 27 held in its normal unattracted position by the inclined cantilever spring 26. Whenever the frame 14 is energized by sufficient current flowing in the energizing winding 18, a high intensity magnetic flux flows in the air gap between the bent end 29 of the armature 27 and the pole face 16. The armature 27 is attracted toward the pole face 16, and as it approaches the high intensity field near the pole face 16, the magnetic force on the armature 27 gradually increases. This force varies substantially inversely as the square of the distance between the high intensity region and the armature. Accordingly, with sufficient flux flowing in the air gap, the armature moves with a quick action downwardly toward the pole face 16 to close the starting contacts 31 and 32. The momentum of the rapidly moving armature which is moving toward its closed position against the bias of the spring 26 and the spring finger 30 tends to build up excessive kinetic energy in the springs which react to throw the armature 27 back out of its closed position. In short, the armature is attracted to but not held in the closed position and normally would tend to oscillate some time before a stable position was reached.

To avoid an undesirable oscillation of the armature in and out of the closed position, I provide the bent end portion 29 on the armature 27 which is at an angle of approximately 90° with the axial plane of the unbiased spring 26, the bent portion 29 being made thicker than the thickness of the pole face 27. With this construction, a continuously decreasing air gap is provided between the armature 27 and the pole face 16 and a continuously increasing magnetic force is thereby applied to the armature as it moves toward but transversely of the core member 15. The rate at which the air gap may be made to decrease for a given movement of the armature 27 across the pole face is dependent upon the angular relation between the bent end portion 29 and the plane of the cantilever spring 26. The larger this angle is made, the greater will be the rate of decrease in the air gap for a given movement of the armature 27. I prefer to use an angle of approximately 90° although it is obvious that this angle may be varied over a wide range for different sizes of armatures and pole pieces. The increasing force resulting from a continuously decreasing air gap holds the armature 27 positively in a closed position against the force of the springs 27 and 30, and the tendency of the armature 27 to oscillate is minimized. The broad face of the bent end 29 of the armature 27 prevents a reversal of force on the armature 27 which would occur with a narrow face moving entirely past the pole face 16 of the core member 15. The downward movement of the armature 27 is limited by the bumping of the short-circuited winding 28 on the projection 35 of the starting contact 31, as hereinbefore explained, so that the armature 27 never moves wholly below the axial line of the core member 15. The armature is maintained thereby out of engagement with the core member 15 whereby electrical short circuits through the frame 14 are prevented.

I provide, as hereinbefore mentioned, a short-circuited winding 28 encircling the armature 27 adjacent the bent end 29. The winding 28 serves to dampen the vibration of the armature 27 in the air gap as the alternating excitation on the core member 15 varies from zero to a maximum value during each half cycle. The damping effect of the short-circuited winding 29 is due mainly to the out-of-phase flux produced by the circulating current induced by the changing main flux from the core member 15. A substantial portion of the out-of-phase flux, which is 90° out-of-phae with the main flux, passes from the armature 27 across the air gap to the core member 15, and since this flux will obtain a maximum value when the main flux is passing through its minimum value, the magnetic pull exerted by the out-of-phase flux tends to stabilize the armature. In this fashion the damping winding 28 and the bent end 29 of the armature 27 cooperate to prevent the undesirable condition of armature oscillation in and out of the closed position when the contacts 31 and 32 are in engagement.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. An alternating current relay comprising a unitary magnetizable frame, a core member and an extending portion on said frame on substantially a common plane, an energizing winding for said frame on said core member, a pole face at the end of said core member, a cantilever spring normally positioned at a slight angle with said common plane and mounted for lateral oscillation in a plane perpendicular to said common plane, said cantilever spring having one end fixed to said extending portion of said frame and its other end free for motion from said normal position to an attracted position when said frame is magnetically energized, an armature attached to said free end of said cantilever spring adjacent said pole face, said armature having an end portion of greater thickness than the thickness of said pole face, said end portion of said armature being attracted by said pole face to move thereacross with a continuously decreasing air gap therebetween, switching means including a spring mounted contact operable by said armature, means limiting the movement of said armature in said attracted position thereby to prevent it from passing the center line of said pole face, a short circuited winding for said relay, said winding, said end portion on said armature and said limiting means co-operating to prevent a reversal of magnetic force on said armature and effectively minimizing the tendency of said armature to oscillate under the bias of said cantilever spring and the spring force of said spring mounted contact when said armature is moved to said attracted position.

2. A motor controller comprising an insulating base provided with a supporting wall extending lengthwise thereof, one face of said base being thereby separated into a first area and a second area thereon, means including an overload current responsive device mounted on said first area of said base, means including an alternating current relay having a yoke-shaped magnetizable frame mounted on said wall, said frame having a core member spaced above said second area of said base and having an extending portion spaced above said overload device, a fixed contact for said overload device supported by an electrically connected to said extending portion of said frame, a movable overload contact co-operating with said fixed contact, means including said fixed overload contact for connecting said frame in an electric circuit in series relation with said overload device, a cantilever spring supported by said frame and extending in substantially parallel spaced relation with said wall and above said second area of said base, and an armature carried by said spring adjacent said core member on said frame.

3. A motor controller comprising a base provided with a supporting wall extending lengthwise thereof, one face of said base being thereby separated into a first area and a second area thereon, a means including an overload current responsive device mounted on said first area of said base, means including an alternating current relay having a yoke-shaped magnetizable frame mounted on said wall, said frame having a core member spaced above said second area of said base and having an intermediate portion of said yoke spaced above said overload device, a fixed contact for said overload device supported by and electrically connected to said intermediate portion of said frame, a movable overload contact co-operating with said fixed contact, means including said fixed overload contact for connecting said frame in an electric circuit in series relation with said overload device, a cantilever spring supported by said frame above said second area of said base and movable in a plane substantially perpendicular to said base, an armature carried by said spring adjacent said core member on said frame, an energizing winding on said core member and electrically connected to be energized in a circuit including said frame, switching means operable by said armature and electrically connected to be energized in a circuit including said frame, and means for limiting the movement of said armature in its attracted position adjacent said core member when said energizing winding is energized to maintain said armature out of engagement with said core member, whereby electrical short circuits through said frame are avoided, and for preventing said armature from passing the axial center line of said core member thereby to minimize the tendency of the armature to oscillate.

GEORGE M. HAUSLER.